United States Patent [19]
White

[11] Patent Number: 5,810,137
[45] Date of Patent: Sep. 22, 1998

[54] DOUBLE-BEAM CUT-OUT SECTION INSULATOR

[76] Inventor: Paul F. White, 70 Elmwood Rd., Wellesley, Mass. 02181

[21] Appl. No.: 775,776

[22] Filed: Dec. 31, 1996

Related U.S. Application Data

[60] Provisional application No. 60/009,627 Jan. 5, 1996.
[51] Int. Cl.⁶ ...................................................... B06M 1/18
[52] U.S. Cl. ........................ 191/39; 191/33 R; 174/137 R
[58] Field of Search ........................... 174/137 R, 138 R, 174/139, 140 R, 140 S, 140 CR, 143, 144, 145, 160, 161 R, 162, 163 R, 158 R, 176, 177, 197, 191, 202; 191/39, 40, 41, 42

[56] References Cited

U.S. PATENT DOCUMENTS

| | | | |
|---|---|---|---|
| 4,406,930 | 9/1983 | Menhorn et al. | 191/39 |
| 4,424,889 | 1/1984 | Hokele et al. | 191/39 |
| 4,716,261 | 12/1987 | Wehrberger et al. | 191/39 |
| 5,117,072 | 5/1992 | White | 191/39 |

*Primary Examiner*—Kristine L. Kincaid
*Assistant Examiner*—Kamand Cuneo
*Attorney, Agent, or Firm*—William Nitkin

[57] ABSTRACT

A section insulator for securing adjoining overhead contact wires for use by electric vehicles having a current collector, such section insulator including structural members to prevent destructive arcing caused by the passage of the current collector thereover. The structural members include first and second tension beams with replaceable arc shields mounted thereon, an adjustable center runner which can be lowered to compensate for wear, and arcing horns of a configuration to aid in the dissipation of electric arcs away from the structural members.

7 Claims, 3 Drawing Sheets

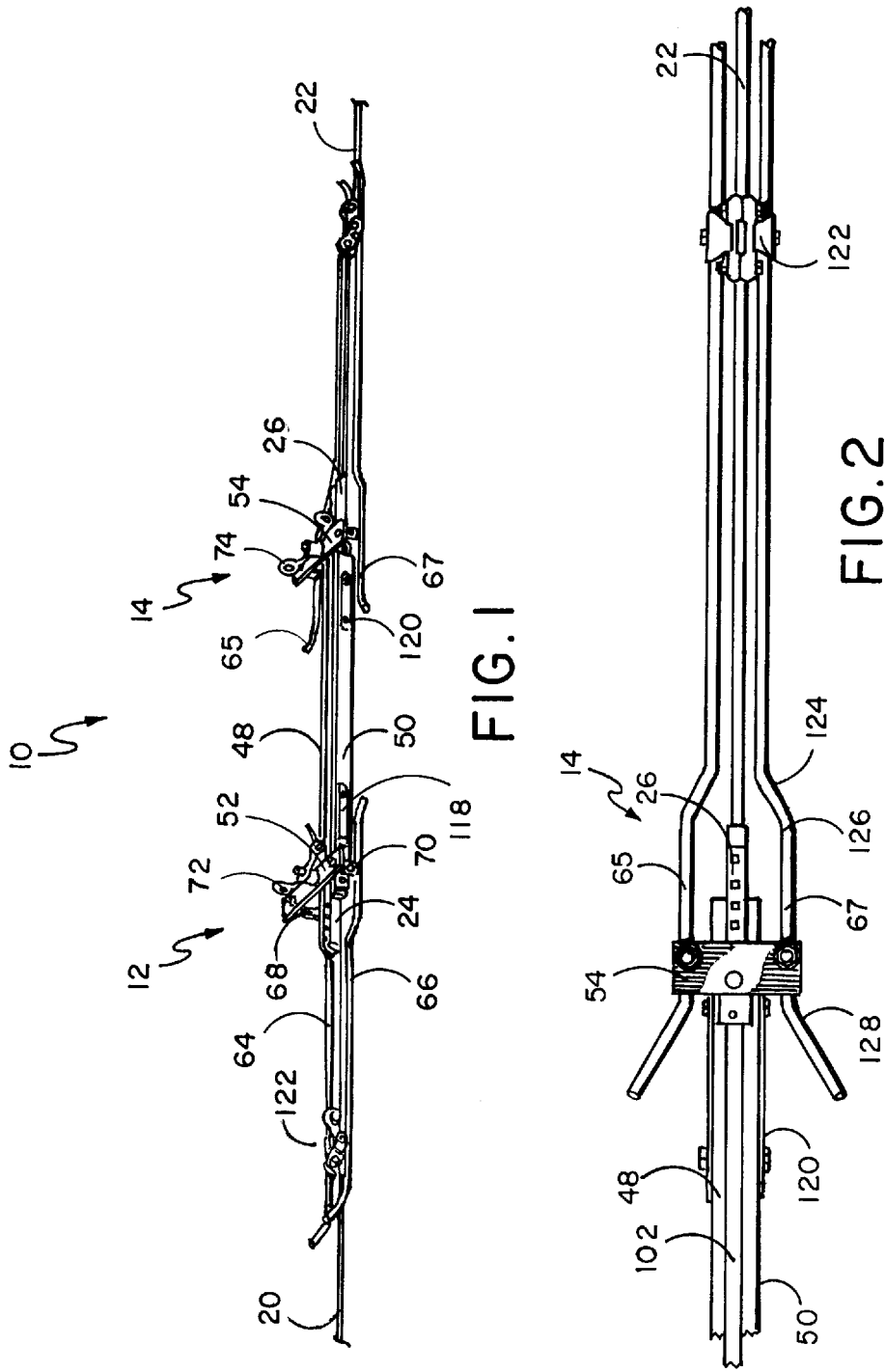

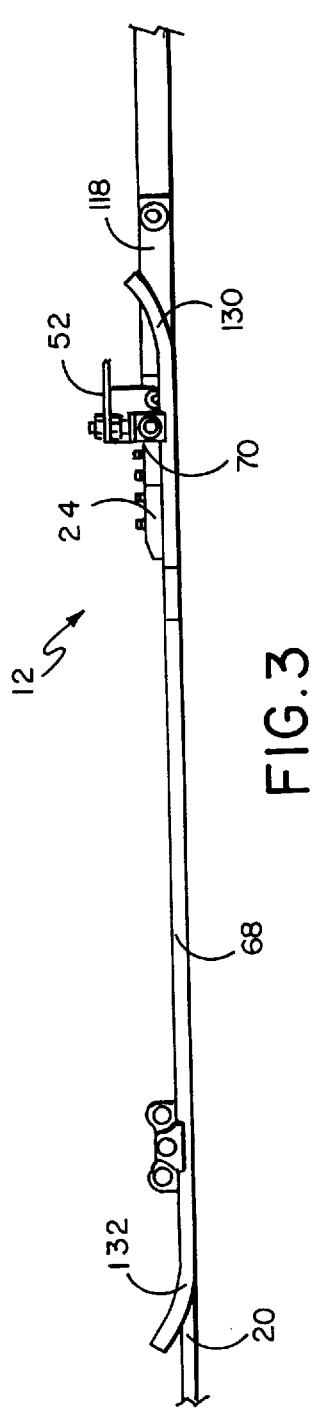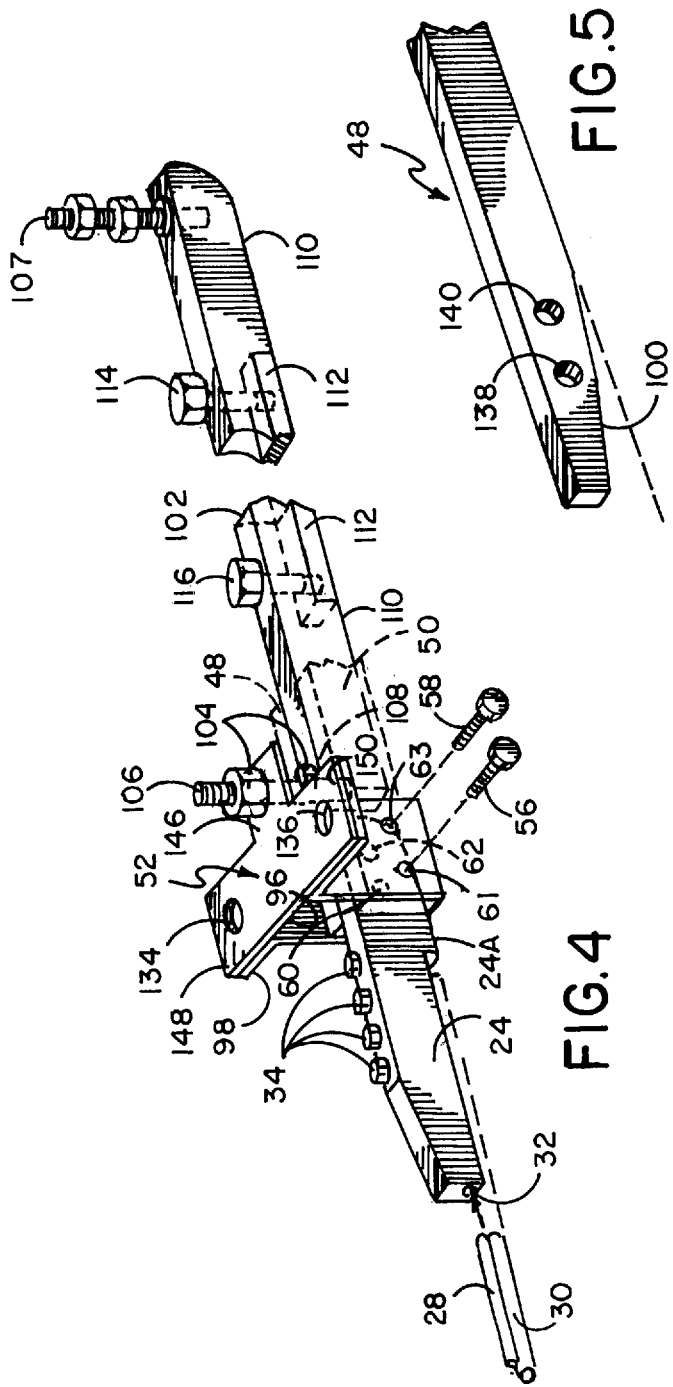

DOUBLE-BEAM CUT-OUT SECTION INSULATOR

This application claims benefit under 35 USC 119 (e) of U.S. Provisional Application under the same title, application Ser. No. 60/009,627 filed Jan. 5, 1996 , now pending.

BACKGROUND OF THE INVENTION

1. Field of the Invention

This invention resides in the field of structures for insulating separate power circuits of overhead electrical contact wires used by railway vehicles and the like and more particularly relates to a double-beam cut-out section insulator that reduces arcing between power circuits.

2. Description of the Prior Art

Many electrified railway systems utilize overhead contact lines to provide electric power to vehicles, which electrical power is passed along to the vehicle through current collectors such as pantographs. Typically, the overhead contact wire system is divided into separate electrical circuits such that the circuits are individually isolated without affecting one another. Each contact wire of each circuit where joined must be mechanically interconnected but electrically isolated from the other contact wires.

Various types of section insulators perform this circuit isolation function, with the two major types being bridging and non-bridging section insulators. The bridging-type section insulator allows the current collector to pass therethrough always in contact with an energized portion of the running surface. In this way power to the vehicle is not interrupted. However, the two adjacent power circuits are momentarily joined together as the current collector passes through. With the non-bridging-type section insulator, the current collector passes through the section insulator to a point where the current collector is not on an energized portion of the running surface, so that the vehicle consequently loses power until the current collector passes completely through the section insulator onto the next energized portion of the contact wire. As the vehicle passes from an energized contact wire onto the section insulator to its de-energized portion, also called the non-conducting portion, the current collector experiences an interruption in current flow and an electrical arc develops which is extinguished as the pantograph travels further along the section insulator to the next energized portion of the contact wire. Wear to the running surface of the section insulator from both the electric arc thus created and friction of the pantograph, being mechanical wear, tends to cause a loss of surface on the running surface of the section insulator.

The problem of arcing also creates significant heat and causes damage to the other structural components of the section insulator. Continual arcing can reduce the cross-sectional area of the structural members of the section insulator to such a degree that the high mechanical tension placed on it by the adjacent contact lines can cause the section insulator to fail and pull apart.

SUMMARY OF THE INVENTION

It is an object of this invention to provide a section insulator to insulate separate power circuits from one another on overhead contact wires associated with electric railways and the like, to eliminate the destructive effects of arcing to the structural members of the section insulators to prevent electrical tracking, from buildup of current collector carbon, and to provide adjustable means to compensate for wear of the running surfaces of the section insulator, as described below.

A further object of this invention is to provide a section insulator of very light weight with a low center of gravity so that the likelihood of its tipping over is eliminated. This combination of light weight and low center of gravity allows the section insulator of this invention to remain stable and in alignment as current collectors pass therethrough. The lifting of the contact wire from either the energy of the travelling wave in the contact wire set up by the inertia of the current collector at high speed or due to the upward pressure of multiple pantographs will not cause the section insulator of this invention to tip over. Also, due to the light weight and low center of gravity of the section insulator of this invention, many types of suspensions can be used with it for support which suspensions include, but are not limited to, messenger suspensions as found in catenary systems, direct suspension systems also known as rigid suspension systems, pendulum suspension systems, suspension by elastic tunnel arm, or a suspension located on a contact wire where no direct support is attached to the contact wire. The section insulator of this invention can also be installed unsupported in lengths of contact wire with short support spans.

It is a still further object of this invention to provide in one embodiment means where passage of a current collector will not electrically bridge two adjacent power circuits, and the ensuing arc from the interruption of current will not follow the current collector as the current collector engages the runner/arcing horns of the adjoining circuit as such arc is dissipated by the structure of the section insulator of this invention, as described below.

It is a still further object of this invention, in another embodiment, to allow electrical bridging of two adjoining power circuits, if so desired, where non-bridging operation is not warranted. This bridging can be accomplished by positioning the two sets of runner/arcing horns with one set on each end of the section insulator closer together than the length of the current collector in the embodiment where the current collector travels directly on the bottom surface of the tension beam, as described below. In yet another embodiment a height-adjustable, modified center runner can be installed between the tension beams where a portion of the center runner is conductive and attached to a wire connected to one of the adjoining power circuits. In this way, the current collector can also be in contact with an energized conducting member at all times. In yet another embodiment, the tension beams have sloped surfaces on the top and bottom at each end and a recessed surface on the top and bottom of the tension beam in area where fiberglass angle-shaped arc shields are located, two per tension beam for the full length between runner support brackets in that protection to the sides and bottom of the tension beam from destructive arcing is provided. The arc shields also provide protection from frictional wear from the pantograph current collector.

It is a further object of this invention to provide means of changing the tension beams with angle arc shields to two different operational modes, one being without a center runner and the other being with a center runner. This is accomplished by turning the tension beams 180 degrees on the anchor tip so that the bottom surface becomes the top surface. Without the center runner, the bottom surface of the tension beam with angle arc shields is at the same elevation as the contact wire and bottom of anchor tip end. In the center runner mode, the bottom surface of the tension beams with angle arc shields is slightly above the elevation of the contact wires and bottom of the anchor tip end. The center runner is adjusted to match the plane of the contact wire so that the pantograph never touches the tension beams. All carbon buildup is done on the bottom of the center runner which is completely insulated from either contact line, thus preventing electrical tracking.

It is yet a further object of this invention to provide an anchor tip for attaching adjacent contact wires to the section insulator in a manner to provide adequate termination with easy installation, thereby reducing the chance of any improper installation. Each anchor tip is made of high tensile strength bar stock and is machined to shape to particular dimensions. No parts of this anchor tip are cast or welded so as to prevent internal structural defects from poor foundry practices or welding practices or other anomalies which can occur in the casting or welding process. By making the anchor tip out of high tensile strength bar stock, the internal structure of the metal is free of voids, blow holes, cold cracks, shrinkage and other problems often encountered with castings or welding.

The groove for the upper lobe of the contact wire is precision machined for a perfect fit so that the contact wire does not wobble or rattle when inserted into the anchor tip. The entrance way of the groove can have a small, outwardly flared opening for easier positioning therein of the end of the contact wire. Also, at the entering end of the grooveway in each anchor tip where its respective contact wire is inserted, such grooveway entrance is tapered outward to prevent the groove of the contact wire from causing strips of metal to be peeled therefrom as it is inserted into the anchor tip. Such entryway taper is helpful should the need arise to strike the ends of the anchor tip with a hammer to facilitate installation as such wider entrance helps prevent the distortion of metal to a point where it might damage the grooveway. In one embodiment four high-strength steel alloy set screws are screwed into threaded holes in the top of the anchor tip and tightened downward into the top of the upper lobe of the contact wire in the grooveway. The set screws are designed to be of such a length that when completely screwed down, their tips bite into the contact wire a preselected, consistent distance. In this way, the screws cannot be over-tightened. Thus, when the screws are bottomed out, the section insulator is properly installed, allowing for a mistake-proof set screw installation procedure.

The set screws increase their holding power due to the embedment of their tips into the upper lobe of the contact wire. The set screws are engaged into the anchor tip in a horizontal plane, each perpendicular to the contact wire and each set screw having a fine thread. The pressure of the tightened set screws forces the sides of the contact wire against the grooveway with such pressure that the contact wire cannot slip and be pulled out of the anchor tip. Extreme tension exceeding the ultimate strength of the contact wire usually will not pull the wire out of the anchor tip but rather will cause the contact wire to break outside of it. Two holes for attachment of high-strength anchor bolts are provided at the end of the anchor tip where it is attached to the tension members, such holes being located at the top plane of the contact wire so that the line of force exerted by the contact wires is in line with the tension bolts and thus minimizing bending moment forces at the contact wire anchor tip.

In another embodiment, the anchor bolt holes of the contact wire anchor tip used for a version of the invention using reversible tension beams has the anchor bolt holes positioned in such a way that when the tension beam is attached in one orientation, its bottom surface is at the same elevation as the bottom of the contact wire anchor tip and bottom surface of the contact wire; and when the tension beam is attached in the other orientation turned 180 degrees, the bottom surface of the tension is slightly above the bottom surface of the contact wire anchor tip and bottom surface of the contact wire.

The structure of this invention incorporates an insulating member in its central portion made of two non-conducting fiberglass tension beams, to the ends of which the contact wire anchor tips are attached, one being at each end. Brackets for supporting the two sets of runner/arcing horns fit over the two fiberglass tension beams at the point where the contact wire anchor tip is attached, one bracket being at each end of the section insulator. The brackets, two tension beams and their respective anchor tips are secured together on each end of the section insulator with two high-strength bolts so that the diameter of any through-holes can be minimized. One embodiment of the double-beam cut-out section insulator of this invention utilizes the tension beams for a running surface, and another embodiment utilizes a runner inserted between the tension beams which runner is adjustably connected at each end at the support bracket. This embodiment utilizes flat fiberglass plate arc shields mounted on the side of the tension beams, and the pantograph current collector rides on the bottom surface of said beams directly. With a center runner, this embodiment utilizes flat plate arc shields mounted on the side of the tension beams, and the pantograph current collector rides on the bottom surface of the center runner.

Attached to each bracket are two runner/arcing horn support clamps, one on each side, each referred to as a clamp with stud. Each bracket also has provision for attaching various suspension fittings. The brackets, anchor tips, and tension beams form an integral unit and are spliced into the contact wires so that the unit mechanically joins the contact wires as one line yet insulates them into two separate power circuits.

The underrun, which is the current collector's running surface, is of such shape and configuration that current collectors can pass through the section insulator, as is, without the addition of the runner/arcing horns. In locations where operation is extremely limited and of relatively slow speed, the section insulator by itself can be used in this configuration. Where there is to be extensive use, use at high speeds and where a greater current draw is to be expected, the runner/arcing horns can be installed.

The runner/arcing horns are composed of standard grooved trolley wire which is bent in a manner to provide rigidity, smoothness of operation and to provide arc extinguishing capabilities, as described below. To obtain smooth passage for the current collector and optimum rigidity for the runner/arcing horns, the runner/arcing horns are curved upward vertically 30 degrees on their entering and leaving ends. There is also a 30 degree outward/inward offset of each runner/arcing horn at the anchor tip-bracket support interface in the horizontal plane which adds rigidity to the ends of the runner/arcing horns and allows clearance so that they can be close to the contact wire and support bracket, thereby also increasing the section insulator's stability. At the leaving end of the runner/arcing horn, its end is also bent outward 30 degrees away from the axis of the section insulator in the horizontal plane and also curved upward 30 degrees in the vertical plane.

The upward and outward curving of the runner/arcing horns draws the arc away from the structural tension beams and keeps the arc from being drawn out horizontally following the current collector by forcing the arc to travel away from the tension beams both vertically and horizontally so that the arc is extinguished before the current collector passes onto the adjacent set of runner/arcing horns. Circuit bridging is thus prevented.

One end of each set of runner/arcing horns is attached to the contact wire at a predetermined distance away from the contact wire anchor tip by means of a special three-wire clamp and is attached at the bracket support by runner/arcing horn clamps with studs, which are adjustable. The three-wire clamp utilized is attached separately to the main contact wire, with each runner/arcing horn attached to the three-wire clamp on either side in such a manner that each runner/arcing horn can be attached or removed without affecting the attachment of the three-wire clamp to the contact wire or the opposite runner/arcing horn.

The clamp with stud attaches to its respective runner/arcing horn and to lateral arms extending from the support bracket by a threaded stud with nuts on the bottom and top surfaces of the support bracket, the adjustment of which nuts moves the threaded stud up or down. This attachment allows the runner/arcing horns to be adjusted vertically to make for smooth entry and exit of the current collector through the section insulator and to be adjustable to compensate for wear to the bottom surfaces of the runner/arcing horns. As the bottom surfaces of the runner/arcing horn wear, the clamp with stud can be lowered to such adjustments. Each runner/arcing horn is independent and can be adjusted separately. The attachment or removal of a runner/arcing horn can be accomplished easily at the clamp with stud since the clamp is attached to the top lobe of the runner/arcing horn with a screw that is separately adjustable from the stud's height-adjustment means.

Also disclosed are additional means to prevent destructive arcing from damaging the main structural members of the section insulator by the mounting of replaceable arc shields on the tension beam members opposite the outwardly disposed ends of the runner/arcing horns where all arcing takes place. Thus, means to direct electric arcs away from the main structural members are provided by use of the runner/arcing horns of a shape and geometry so configured that the arc is drawn away outward in the horizontal plane from the main tension beam members and up into the vertical plane to prevent such arc from following the current collector, such arc then being extinguished without damaging the section insulator.

The arc shields of one embodiment also protect the bottom surface of the tension beams being that they are fiberglass angles that fit snugly against the side of the tension beam, said tension beam being recessed to accept the arc shield so that it sits flush with the bottom mating surface of the tension beam to protect the tension beam from destructive arcing or from frictional wear.

These arc shields also protect the main tension members to which each contact line of separate power sections is attached through an anchor tip described herein from electrical tracking across the section insulator due to carbon build-up. Should cleaning of the running surface of the arc shields become impossible or should they become worn out, they can easily be replaced with new arc shields.

The section insulator of this invention also includes further means to compensate for wear to the running surfaces caused by contact from the current collector, such means being independent from the suspension devices of the section insulator where the height of each runner/arcing horn can be raised or lowered through adjustment of nuts on its threaded stud clamp, each independently adjustable so that adjustment of one part does not affect the adjustment of any other. Also, means are provided to adjust the height of the center runner to compensate for wear to its running surface on which the current collector makes contact which means are also independent from the suspension of the section insulator where the height of the center runner can be raised or lowered through adjustment of nuts on threaded apertures on protrusions from each support bracket, respectively. The threaded members are independently adjustable so that adjustment of one end of the center runner does not affect its other end, and any adjustment to the center runner does not affect the adjustment of any other part of the device.

The device also includes means to secure adjacent contact wires with an anchor tip for each contact wire. Since the device is of low profile with the plane of support of the tension bolts being in line with the plane of the contact wire, bending moment forces at the anchor tips are virtually eliminated.

The invention further includes means to allow non-bridging of the power circuits by positioning one pair of the runner/arcing horns away from the other pair of runner/arcing horns at a distance greater than the width of the current collector. The invention also includes means to allow bridging of the power circuits by two methods: one method by positioning one pair of the runner/arcing horns from the other pair of runner/arcing horns a distance less than the length of the current collector so that the current collector is always in contact with an energized surface, and the other method by the use of a conducting center runner which is electrically connected to one of the power circuits.

BRIEF DESCRIPTION OF THE DRAWINGS

FIG. 1 illustrates a perspective view of an embodiment of the section insulator of this invention not utilizing a center runner.

FIG. 2 illustrates a top plan view of one end of the section insulator of this invention utilizing a center runner.

FIG. 3 illustrates a side elevational view of the opposite end of the embodiment shown in FIG. 2.

FIG. 4 illustrates a perspective view of one end of the section insulator, with portions eliminated, showing the center runner.

FIG. 5 illustrates a perspective view of one end of a tension beam.

DESCRIPTION OF THE PREFERRED EMBODIMENT(S)

Figure 6:
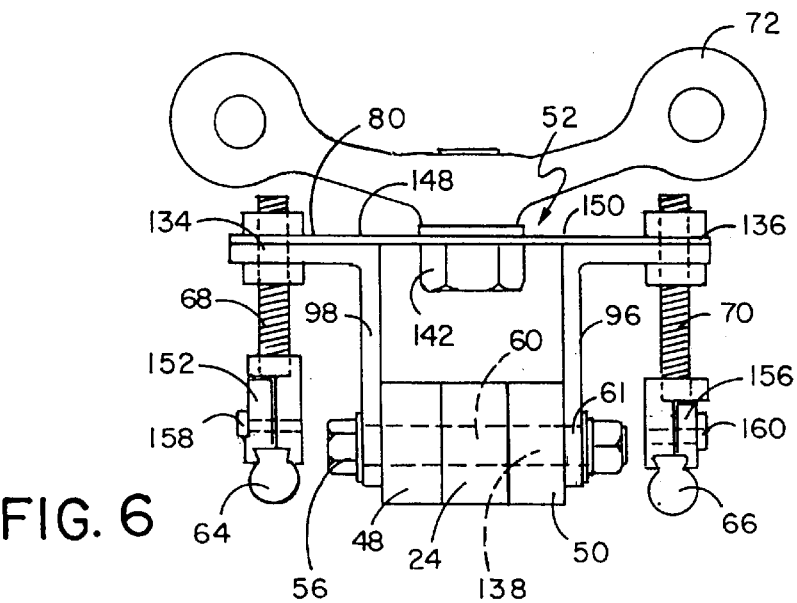
FIG. 6 illustrates a cross-sectional view through a support bracket.

FIG. 1 illustrates a perspective view of one embodiment of section insulator 10 of this invention for overhead contact wires of electric railways disposed between two separate power circuits of first and second contact wires 20 and 22. Section insulator 10 is connected to first and second contact wires 20 and 22, respectively, by first and second anchor tips 24 and 26 at each end of section insulator 10. Top lobe 28 of grooved contact wire 30, as seen in FIG. 4, inserts into grooveway 32 of anchor tip 24 and provides a snug fit. Set screws 34 are then screwed down against top lobe 28 completely until further turning becomes impossible. This complete tightening assures a mistake-proof installation. Each set screw 34 can have a fine thread to prevent loosening of the set screw from vibration, and each set screw can have a square head to facilitate installation without the use of specialty tools.

First and second anchor tips 24 and 26 are connected, respectively, to first and second elongated fiberglass tension beams 48 and 50 as seen in FIG. 1; and first and second runner support brackets 52 and 54 are attached, respectively, at each end by two high-strength anchor bolts, such as anchor bolts 56 and 58, seen in FIG. 4, extending through a pair of apertures formed in the anchor tips, each end of the tension beams and in a portion of each bracket, as described below. These connections are accomplished at each end 12 and 14 of section insulator 10 as partially seen in FIG. 1. As previously mentioned, first and second anchor tips 24 and 26 have two holes 60 and 62 seen in dotted lines in FIG. 4 for receipt of anchor bolts 56 and 58 at the top plane of the contact wire so that bending moments are virtually eliminated. Anchor tip 24 is sandwiched between first and second tension beams 48 and 50, each of which has a pair of holes such as holes 138 and 140 at each end for receipt therethrough of the first and second anchor bolts, respectively, as seen in FIG. 5. The length of first and second tension beams 48 and 50 is dependent upon the voltage of the overhead contact wire system and the required distance between the sets of second runner/arcing horns. First and second runner support brackets 52 and 54 are not structural members which are subjected to contact wire tensions. Runner support brackets 52 and 54 provide support, respectively, for the first set of runner/arcing horns 64 and 66 and second set of runner/arcing horns 65 and 67 by clamps with studs such as 68 and 70 supporting one end of the first set of runner/arcing horns, and also for suspension support members such as 72 seen in FIGS. 1 and 6, such suspension support members being well known in the art.

First and second runner support brackets 52 and 54 are each made of two steel right angle members with a top connector plate welded to steel angle members 96 and 98 to create a one-piece bracket as seen in cross-section in FIG. 6. The bracket is of sufficient strength yet of light weight; and with the height of each bracket, such as bracket 52, positioned above contact wire 22 being only 2.75 inches and having a width of 5 inches and with the overall width of the first set of runner/arcing horns 64 and 66 attached by clamp studs 68 and 70 to runner support bracket 52 being only 4 inches, a very low center of gravity is achieved. This low center of gravity prevents the entire unit from tipping over when upward pressure of the current collector is placed on first and second contact wires 20 and 22. Support bracket 54, being only 4 inches in height, allows a very low center of gravity to be achieved.

Prior art structures require various supports to be directly attached to them to prevent their tipping, whereas the present invention can be utilized with overhead first and second contact wires 20 and 22, as seen in FIG. 1, in one embodiment without any other direct support, dependent upon the length of the span. Means of support, where deemed necessary due to very long spans being long distances between supports, can be of the various well-known types. The double-beam cut-out section insulator of FIG. 1 can be supported by a rigid suspension such as by attachment to a supporting span wire which is attached by wires to each suspension support, such as 72 and 74, attached to each runner support bracket 52 and 54, respectively, as seen in FIGS. 1 and 6.

First and second tension beams 48 and 50, when assembled to each side of first and second anchor tips 24 and 26, have a tapered side 100 which can be positioned in two different orientations. The first orientation is where the tapered end side 100 of the tension beam, seen in FIG. 4, is turned upside down and placed against the anchor tip in the up position. This orientation is used when an adjustable center runner 102 is to be positioned between the tension beams with the bottom surface of such center runner adjusted to coincide with the bottom plane of the contact wires and the bottom plane of the runner/arcing horns while the bottom of the tension beam is above the runner contact plane. The second orientation shown is where the tapered end side 100 of the tension beams is placed against the anchor tips in the down position seen in FIG. 5. This orientation allows the bottom plane of the two tension beams 48 and 50, when center runner 102 is omitted, to lie in the same plane as the bottom of the contact wires and the runner/arcing horns to form part of the running surface. The choice of either orientation is determined by the railway system. In either orientation, travel through the unit as the current collector passes along the entire section insulator is smooth and bounce-free.

Figure 7:
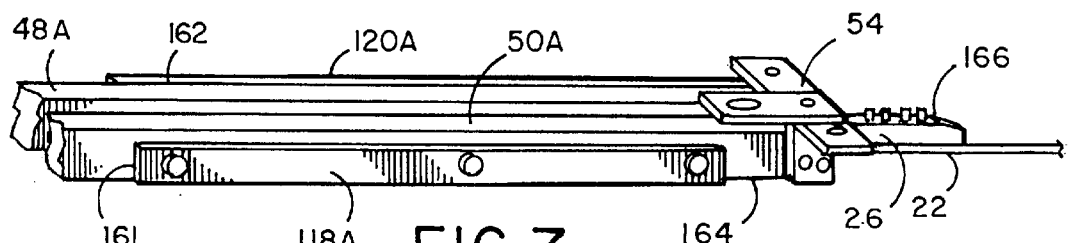
FIG. 7 illustrates a perspective view of an alternate embodiment of the tension beams showing the fiberglass angle arc shield.
Figure 8:
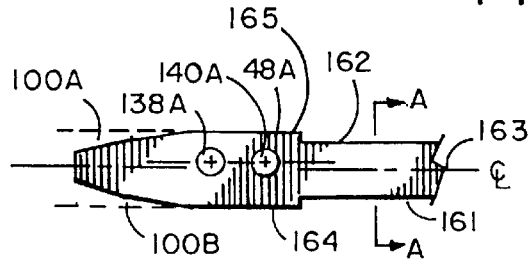
FIG. 8 illustrates an embodiment of the section insulator showing a reversible tension member with a recess for the fiberglass angle arc shield.
Figure 10:
FIG. 10 illustrates a cross-sectional view through the tension beam of the embodiment shown in FIG. 8.
Figure 9:
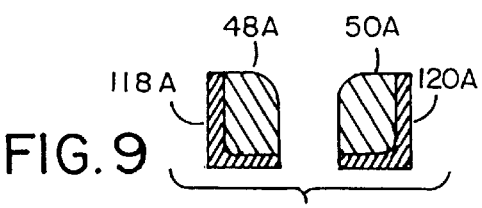
FIG. 9 illustrates a cross-sectional view through the tension beams of the embodiment shown in FIG. 7.

FIG. 7 illustrates a perspective view of one embodiment of section insulator 10 of this invention where elongated fiberglass tension members 48A and 50A are attached to first and second anchor tip 24 and 26 with only anchor tip 26 seen in this view. Tension members 48A and 50A can have sloped ends and accept a fiberglass angle arc shield 118A and 120A seen better in cross-sectional view in FIG. 9. Each tension member 48A and 50A seen in cross section in FIG. 10 have two holes such as 138A and 140A seen in FIG. 8 at each end for attachment of anchor bolts such as 56 and 58. The positioning of holes 138A and 140A are such in relation to center line 163 of the tension beam that when the two tension beams 48A and 50A are attached to contact wire anchor tips 24 and 26 in the same orientation, surface 164 is on the same elevation as the bottom surfaces of the anchor tips such as bottom 26A of anchor tip 26 which also coincides with the bottom surface of the adjoining contact wires 20 and 22. This positioning allows running of the pantograph current collector directly on tension beams 48A and 50A and fiberglass angle arc shields 118A and 120A. When the tension beams 48A and 50A are attached to the contact wire anchor tips such as 166 with holes 138A and 140A and said holes are in the same orientation to center line 163 of the tension beam and that surface 165 is on the bottom, surface 165 is slightly above bottom surface 26A of anchor tip 26 and bottom surface of contact wire 22. This embodiment allows center runner 102 to be utilized, and the pantograph current collector does not make contact with tension beams 48A and 50A at all as it rides on the bottom surface of center runner 102.

The advantage of using center runner 102, as seen in FIG. 4, is that mechanical and electrical wear can be compensated for by making adjustments to the positioning of center runner 102. This adjustment is accomplished by loosening and tightening jam nuts 104 on threaded stud 106, as seen in FIG. 4, passing through bracket protrusion 146. Lower nut 108 is not turned for adjustments but for securing threaded rod 106 into center runner 102. As the section insulator wears, the bottom surface of first set of runner/arcing horns 64 and 66 and the bottom surface of center runner 102 can be adjusted to a lower position to compensate for such wear. The runner/arcing horns, such as 64 and 66, can also be lowered to be in the same plane as the bottom plane of center runner 102 by making adjustments to first and second clamp studs 68 and 70 at their respective jam nuts which studs pass through apertures 134 and 136 in support bracket arms 148 and 150 as seen in FIG. 4. Clamps 152 and 156 seen in FIG. 6 are affixed at the ends of threaded studs 68 and 70 and are tightened by screws 158 and 160 onto the top lobes of each runner/arcing horn.

For example, if unevenness of wear is encountered on either first runner/arcing horn 64 or second runner/arcing horn 66 or on the entering or leaving end of center runner 102, individual adjustments can allow the plane of the bottom surface of all three running surfaces to be matched to be in the same plane. In the same way the second set of runner/arcing horns 65 and 67 can be adjusted with their respective end of center runner 102.

If the configuration of FIG. 1 is chosen, the current collector passes from first and second runner/arcing horn 64 and 66 directly onto first and second tension beams 48 and 50 with first and second runner/arcing horns 64 and 66 and first and second tension beams 48 and 50 having all of their running surfaces in the same plane. The method of operation of the embodiment of FIG. 4 where first and second runner/arcing horns 64 and 66 and center runner 102 can be adjusted for wear is markedly superior to the method of operation of other prior art section insulators not having this feature.

In the invention described herein center runner 102 can be nonconductive in its entirety, and the ensuing electric arc resulting in non-bridging operation does not take place on center runner 102 but on first and second runner/arcing horns 64 and 66. In the bridging version of the embodiment of FIG. 4, non-conducting center runner 110 has a conducting piece 112 which is held in place by first and second threaded stud connectors 114 and 116. An electric wire is attached to one of the threaded studs 114 and 116 and this wire, in turn, is connected to the circuit on either the entering end or the leaving end of the section insulator. This electrical connection provides power to conducting piece 112 of center runner 102.

As seen in FIG. 1, arc shields 118 and 120 are attached to the sides of the tension beams by bolts at such a position on section insulator 10 that any and all potential damage from electric arcs created by interruption of current to the current collector as it leaves contact with first and second runner/arcing horns 64 and 66 is taken up by such arc shields, thus protecting the structural integrity of the tension beams. Similar arc shields are attached to tension beam 48. The arc shields, such as arc shield 118, are so attached to the tension beams that when the arc shield is burnt out, it is easily replaced by loosening and removing its bolts, and replacing any such spent arc shield with a new arc shield and reattaching it by its bolts. The arc shield bolts attach to the tension beams by threaded fittings inserted into each of the tension beams, also known as helicoils.

At each end of the section insulator the respective pairs of runner/arcing horns are positioned and allow for smooth passage of the current collector entering and leaving the device. The runner/arcing horns attach to the contact wires by a clamp at the outer extremity of each, such as clamp 122 seen in FIGS. 1 and 3 and at its other end by a clamp with stud, such as clamp stud 70 at runner support bracket 52 seen in FIG. 6. Clamp 122 is configured in such a way that the contact wire, such as first contact wire 20, is separately attached from the set of runner/arcing horns, such as first and second runner/arcing horns 64 and 66. The set of runner/arcing horns, such as 64 and 66, are also separately attached to clamp 122 so that a runner/arcing horn can be removed without affecting the other runner/arcing horn or the contact wire. Thus, a runner/arcing horn, such as 66, can be connected to clamp 122; and clamp 122 can be removed from the contact wire and then reattached to it. Clamp 122, as seen in FIG. 1, is a commercially available item.

With the double-beam cut-out section insulator of this invention, first and second runner/arcing horns, such as 64 and 66, and third and fourth runner/arcing horns 65 and 67 each consist of a single piece of grooved contact wire. Such wire, as seen in FIGS. 2 and 3, is bent in such a way at first bend 124, second bend 126 and third bend 128 that it becomes rigid and resistant to bending in the vertical plane while retaining enough resiliency that it is not overly stiff at its ends where it is engaged by the current collector at first and second upward bends 130 and 132, as seen in FIG. 3. As seen in FIG. 2, first bend 124, second bend 126, and third bend 128 having corresponding upward bends 170 and 172 are attached to contact wire 22 by clamp 174. FIG. 3 shows the opposite end of the section insulator with upward bends 130 and 132 having corresponding first bend 176, second bend 178, and third bend 180 attached to contact wire 20 by clamp 122. Use of a single piece of contact wire allows reduction in weight of the unit. The runner/arcing horns are angled away from the tension beam at third bend 128. This bend is outward and upward to dissipate the force of the arc created from interruption to power as the current collector passes from an energized surface of the runner/arcing horn and contact wire completely onto a nonconductive center center runner 102 of the embodiment of FIG. 4 or onto the tension beams of the embodiment of FIG. 1. By the shape and direction of the end of each runner/arcing horn, the arc is drawn up and outward simultaneously so that its strength at the moment of collapse is much less than if it followed the current collector parallel to the tension beam. Third bend 128 and first upward bend 130 are positioned opposite an arc shield such as arc shield 120.

Although the present invention has been described with reference to particular embodiments, it will be apparent to those skilled in the art that variations and modifications can be substituted therefor without departing from the principles and spirit of the invention.

I claim:

1. A section insulator, having tension beams and arcing horns having running surfaces and ends, for insulating a first and second overhead contact wire of two power circuits used by electric vehicles having a current collector, comprising:

shield means to prevent destructive arcing from damaging the tension beams of said section insulator, said shield means including replaceable arc shields mounted on said tension beams opposite ends of said arcing horns; and arc extinction means to direct an ensuing electric arc away from said tension beams, said arc extinction means including the arcing horns with a geometry so configured that the arc is drawn away in the horizontal plane from the tension beams and up in the vertical plane to prevent the arc from following the current collector, said arc then being extinguished so the bridging, by said arc, of said power circuits does not occur.

2. The device of claim 1 wherein said section insulator is suspended with a suspension and said device further includes:

wear compensation means to compensate for wear to the running surfaces of said arcing horns, said wear compensation means being independent of said suspension of said section insulator, said wear compensation means providing for the height of each of said arcing horns to be raised or lowered so that adjustment of one of said arcing horns does not affect the adjustment of any other of said arcing horns;

a center runner having a running surface disposed between said tension beams;

center runner adjustment means to adjust the height of the center runner to compensate for wear to said running surface of the center runner, said center runner adjustment means being independent of said suspension of said section insulator where the height of the center runner can be raised or lowered so that adjustment of one end of the center runner does not affect the adjustment of another end and any adjustment to said center runner does not affect the adjustment of any other part of said section insulator;

replacement means to replace each of said arcing horns and center runner independently so that removal and replacement of one of said arcing horns and center runner does not affect the attachment of any other of said arcing horns and center runner; and wear prevention means to prevent wear from electrical arcing and friction to the tension beams wherein said arc shields are of an angular configuration so that they protect outer surfaces of said tension beams when exposed to any arcing at the arcing horns and the bottom surfaces of the tension beams when subjected to wear from said current collector.

3. A suspended section insulator, having tension beams and arcing horns having running surfaces and ends, for insulating a first and second overhead contact wire of two power circuits used by electric vehicles having a current collector, comprising:

a suspension;

shield means to prevent destructive arcing from damaging the tension beams of said section insulator, said shield means including replaceable arc shields mounted on said tension beams opposite ends of said arcing horns;

arc extinction means to direct an ensuing electric arc away from said tension beams, said arc extinction means including the arcing horns with a geometry so configured that the arc is drawn away in the horizontal plane from the tension beams and up in the vertical plane to prevent the arc from following the current collector, said arc then being extinguished so the bridging, by said arc, of said power circuits does not occur;

wear compensation means to compensate for wear to the running surfaces of said arcing horns, said wear compensation means being independent of said suspension of said section insulator, said wear compensation means providing for the height of each of said arcing horns to be raised or lowered so that adjustment of one of said arcing horns does not affect the adjustment of any other of said arcing horns;

a center runner having a running surface disposed between said tension beams;

center runner adjustment means to adjust the height of the center runner to compensate for wear to said running surfaces of the center runner, said center runner adjustment means being independent of said suspension of said section insulator where the height of the center runner can be raised or lowered so that adjustment of one end of the center runner does not affect the adjustment of another end and any adjustment to said center runner does not affect the adjustment of any other part of said section insulator;

replacement means to replace each of said arcing horns and center runner independently so that removal and replacement of one of said arcing horns and center runner does not affect the attachment of any other of said arcing horns and center runner;

wear prevention means to prevent wear from electrical arcing and friction to the tension beams wherein said arc shields are of an angular configuration so that they protect outer surfaces of said tension beams when exposed to any arcing at the arcing horns and the bottom surfaces of the tension beams when subjected to wear from said current collector;

first and second anchor tips, each engaged, respectively, to said first and second contact wires;

first and second runner support brackets, one disposed at each end of said tension beams for supporting said arcing horns;

said device in a first mode utilizing said tension beams without said center runner where said bottom surfaces of said tension beams with said arc shields are disposed at the same elevation as said arcing horns and said first and second contact wires, and said current collector rides on said bottom surfaces of said tension beams with said arc shields; and said device in a second mode utilizing said tension beams with the center runner where in such mode of operation said tension beams are turned 180 degrees from their orientation in the first mode so that the bottom surfaces of said tension means become the top surfaces of the tension beams and are attached to said anchor tips and runner support brackets in exactly the same manner as the first mode above the elevation of said arcing horns and above the bottom surface of said center runner so that said current collector does not contact the bottom surfaces of said tension beams.

4. The device of claim 3 wherein a non-bridging mode of said power circuits is created by said arcing horns being positioned a distance from one another that is greater than the width of said current collector.

5. The device of claim 3 wherein a bridging mode of said power circuits is created by said arcing horns being positioned a distance from one another that is less than the width of said current collector.

6. The device of claim 3 wherein a bridging mode of said power circuits is created by use of said center runner which is conducting and which is electrically connected to one of said power circuits.

7. The device of claim 3 wherein said ends of said arcing horns curve both outwards and upwards for aiding in arc dissipation.

* * * * *